United States Patent

Wiss et al.

[11] Patent Number: 5,556,174
[45] Date of Patent: Sep. 17, 1996

[54] ANTILOCK BRAKE SYSTEM

[75] Inventors: Helmut Wiss, Moeglingen; Rolf Maier, Kernen, both of Germany

[73] Assignee: Robert Bosch GmbH, Stuttgart, Germany

[21] Appl. No.: 435,667

[22] Filed: May 5, 1995

[30] Foreign Application Priority Data

May 6, 1994 [DE] Germany .................. 44 16 007.0

[51] Int. Cl.$^6$ ...................................... B60T 8/32
[52] U.S. Cl. .................... 303/191; 180/197; 303/195
[58] Field of Search .................... 303/100, 103, 303/110, 95, 102, 106, 107, 108, 109, 104; 364/426.01, 426.02, 426.03, 424.1; 188/181 A, 181 R; 180/197

[56] References Cited

U.S. PATENT DOCUMENTS

| | | |
|---|---|---|
| 3,874,741 | 4/1975 | Schnaibel et al. ............... 188/181 A |
| 4,033,633 | 7/1977 | Miller et al. ............... 303/107 |
| 4,138,164 | 2/1979 | Masclet ............... 303/105 |
| 4,180,223 | 12/1979 | Amberg ............... 303/106 |
| 4,497,026 | 1/1985 | Braschel et al. ............... 180/197 |
| 4,701,855 | 10/1987 | Fennel ............... 180/197 |
| 4,836,616 | 6/1989 | Roper et al. ............... 303/100 |
| 5,083,627 | 1/1992 | Kawamoto et al. . |
| 5,108,159 | 4/1992 | Tsang et al. ............... 303/100 |
| 5,109,339 | 4/1992 | Watanabe et al. ............... 180/197 |
| 5,136,509 | 8/1992 | Van Zanten ............... 364/426.01 |
| 5,249,852 | 10/1993 | Beyer et al. ............... 303/108 |

*Primary Examiner*—Douglas C. Butler
*Attorney, Agent, or Firm*—Felfe & Lynch

[57] ABSTRACT

When a differential speed determined from the wheel speeds has superimposed thereon a frequency typical of drive train vibrations, a vibration signal is generated. When the vibration signal exceeds a threshold, a torsional moment based on the difference between the engine speed and the differential speed is used to modify activation times of the brake pressure control valves so that the drive train vibrations decay.

4 Claims, 3 Drawing Sheets

ANTILOCK BRAKE SYSTEM

BACKGROUND OF THE INVENTION

The invention relates to an antilock braking system (ABS) in which wheel speed signals are used to produce brake pressure control signals to prevent slippage at the wheels. Such systems are described, for example, in U.S. Pat. Nos. 5,136,509 and 5,249,852.

During ABS control, particularly in vehicles with front wheel drive, vibrations occur at the driven wheels, these being caused by flexibility between the engine and the wheels.

SUMMARY OF THE INVENTION

By means of the invention, such vibrations are detected and damped by suitable measures. The first requirement here is for the generation of a vibration signal which is characteristic of the presence of such vibrations. The engine speed, reduced to the wheel speed, must furthermore be determined and, if the vibration signal is present, the changes in the torsional moment in the drive train must be determined from the engine speed. The manipulated variable of the ABS controller, e.g. the activation times of the solenoid valves which feed the brake pressure into the wheel cylinders of the driven wheels, are corrected in accordance with this torsional moment to provide damping, i.e. decay of the drive train vibration.

DETAILED DESCRIPTION OF THE PREFERRED EMBODIMENT

Figure 1A:
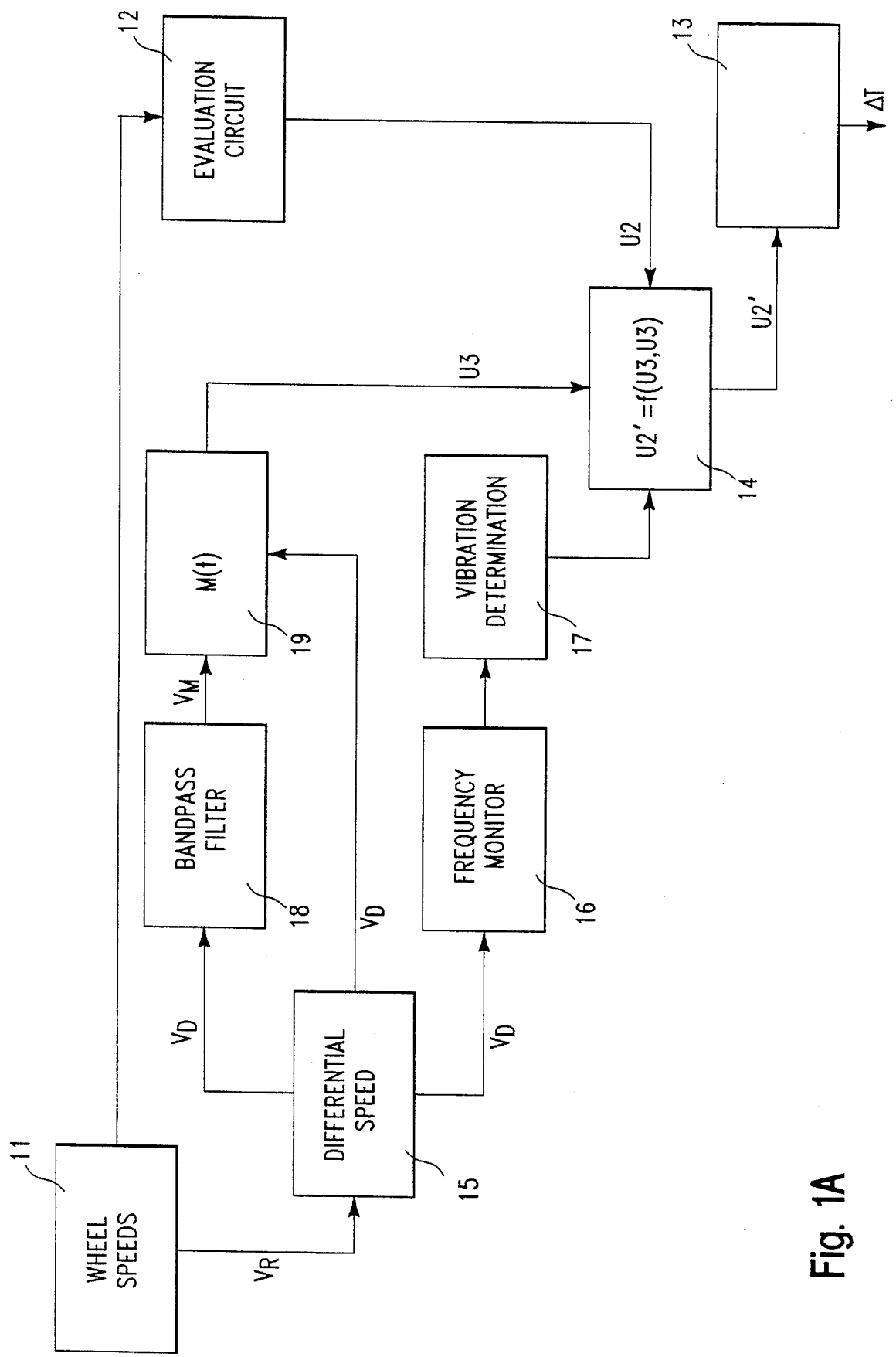
FIG. 1A is a diagram illustrating a first embodiment of an ABS controller according to the invention.

In FIG. 1A, a block 11 which determines the wheel speeds of a vehicle contains wheel speed sensors assigned to the individual wheels or wheel groups. These wheel speed signals $V_R$ are fed to a block 12, which is part of the evaluation circuit and evaluates the wheel speeds in accordance, for example, with the teaching known from U.S. Pat. No. 5,136,509. Signals U2 are output at the output of the block 12 (e.g. in accordance with U.S. Pat. No. 5,136,509), and these are then normally converted in a block 13 into activation times ΔT for the brake pressure control devices (e.g. 3/3-way valves). The pressure build-up and pressure reduction gradients (gain factors) have a decisive influence on the conversion.

According to the invention, when drive train vibrations occur the control variables U2 for the various wheels each have superimposed on them in a block 14 a signal U3 which corresponds to the changes in the torsional moment detected in the drive train. A corrected variable U2' is formed in which the torsional moment is allowed for and from which, in block 13, activation times ΔT are calculated, these bringing about decay of the train vibration, that is to say damping of the latter.

The correction signal U3 is produced as follows:

In a block 15, the speed of rotation at the differential is determined from the speeds of the driven wheels. This speed signal $V_D$ is fed to a block 16 which determines the vibration frequency of the speed $V_D$, e.g. by measuring the time gap between two maxima or two minima of the signal $V_D$. The block 16 also monitors by filtering whether the speed signal has had superimposed on it a signal with a frequency which lies within a specified frequency range (e.g. 5–12 Hz) characteristic of the drive train vibrations of the vehicle. In a block 17, a vibration signal is produced from the variation in the speed of the differential, by, for example, evaluation of the curvature of the speed of the differential by low-pass filtering. That is, the band pass filtered signal $V_D$ from block 16 is twice differentiated to produce the curvature $d^2v/dt^2$. The curvature thus represents change in acceleration, which is largest near a maximum of $V_D$. In the case of a fixed frequency, the amplitude of the vibration increases with the curvature of the speed $V_D$. The curvature is filtered by a low-pass filter in order to eliminate high frequencies.

If this signal exceeds a specified threshold, block 17 produces an output signal which indicates that drive train vibrations are present. The determination of drive train vibrations thus requires both (1) vibration frequency in a specified range, and (2) the low-pass filtered curvature signal exceeds a specified threshold.

Figure 3:
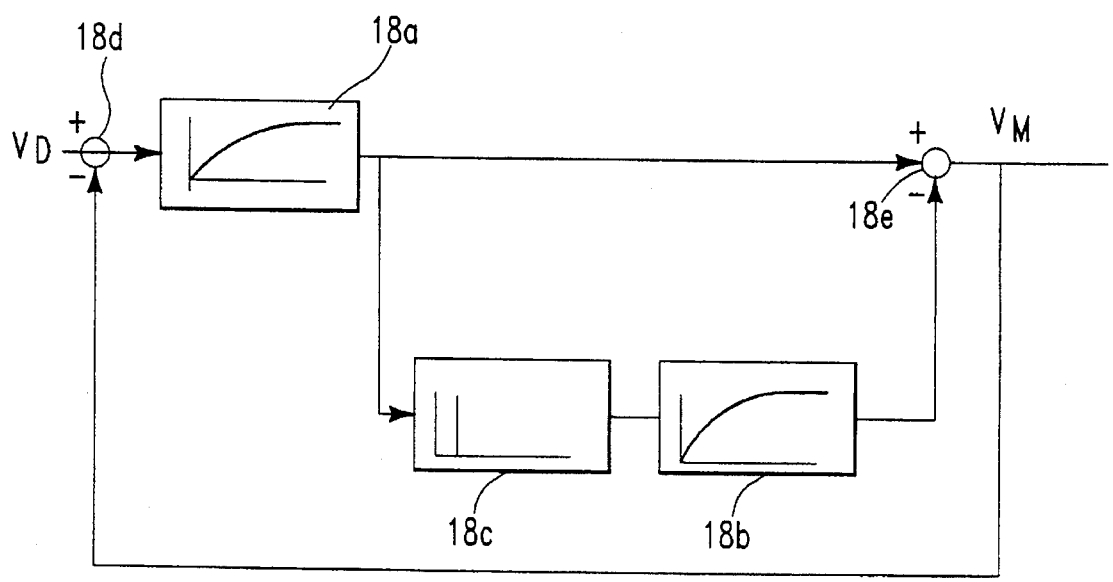
FIG. 3 shows a filter arrangement.

The speed of rotation $V_D$ at the differential is also fed to a block 18, which represents a bandpass filter. The filter can be a second-order linear filter, e.g. a DT2 filter, as illustrated in FIG. 3. In this, blocks 18a and 18b are low passes, block 18c is a differentiator and the elements 18d and 18e are superimposition stages. The engine speed signal $V_M$ is obtained at the output of block 18.

Figure 1B:
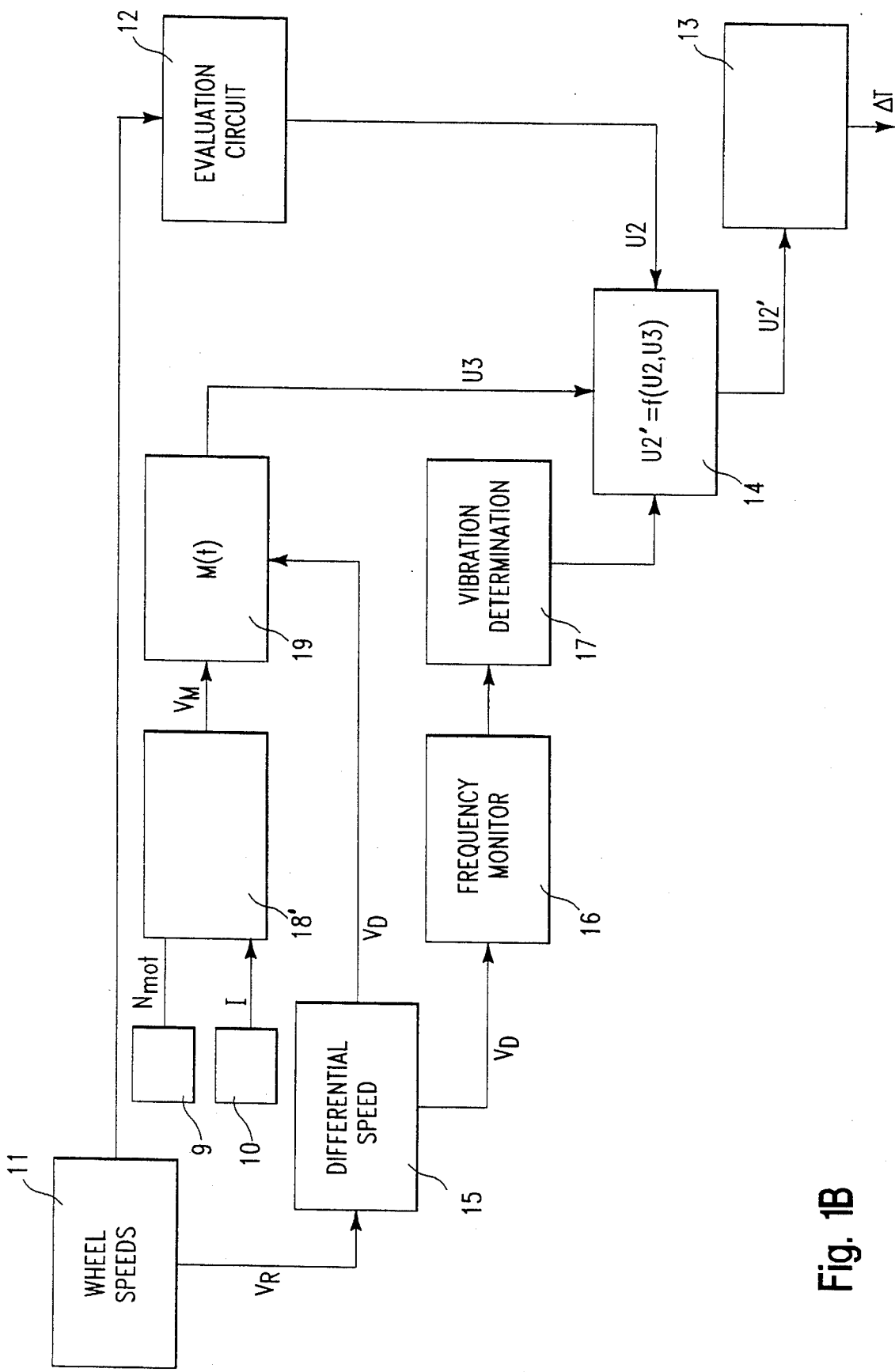
FIG. 1B is a diagram illustrating a second embodiment of an ABS controller according to the invention.

According to a second embodiment, illustrated in FIG. 1B, $V_M$ can be determined in block 18' according to $V_M \sim N_{mot}/I$, where $N_{mot}$ is the directly measured engine speed from sensor 9, and I is the total transmission ratio (transmission and differential) from block 10. Block 10 determines the gear engaged by the transmission in a known way, and the differential ratio is a vehicle-specific constant. Generally the signal generated according to this embodiment is not filtered, however a weak filtering may be necessary if the signal quality is bad (e.g. noise).

The engine speed signal $V_M$ is equivalent to the speed of rotation $V_D$ at the differential (the average of the wheel speeds), when there is a stationary (no acceleration or deceleration) and vibration-free drive mode of the vehicle. Therefore $V_M$ can be determined from the speed of rotation at the differential (first embodiment) or from the engine speed (second embodiment).

The torsional moment M(t) in the drive train is determined in a block 19 in accordance with the following relation:

$$M(t) = \frac{A\omega c}{r_R} [V_M(t-t_T) - V_D(t-t_T)]$$

in this:

c=rigidity between engine and driven wheels
$r_R$=wheel radius
ω=frequency of the vibration
A=amplitude of the torsional vibration
$t_T$=a phase displacement The torsional moment M(t) at time t is thus proportional to the difference between the engine speed $V_M$ and the speed of rotation $V_D$ at the differential at time (t–$t_T$).

The control variable U2 can now be corrected by a variable U3 proportional to the torsional moment M(t) when block 17 indicates that drive train vibrations are present, and the drive train vibrations thus decay. When block 17 indicates no drive train vibrations, U2 is not changed (U2'=U2). From the now corrected manipulated variable U2', valve activation times ΔT are calculated in block 13. By means of the valve activation times, the ABS controller sets pressure changes in the wheel brake cylinder, these in turn leading to changes in the braking torque at the wheel:

$$\Delta M_B = \Delta T \cdot Grad \cdot C_B$$

$\Delta M_B$=change in the braking torque $C_B$=braking constant

Grad=pressure gradient (different for pressure build-up and pressure reduction)

This change in braking torque specified by the ABS algorithm is now corrected by the torsional moment:

$$\Delta T = \Delta T + \frac{M(t)}{Grad \cdot C_B}$$

Figure 2:
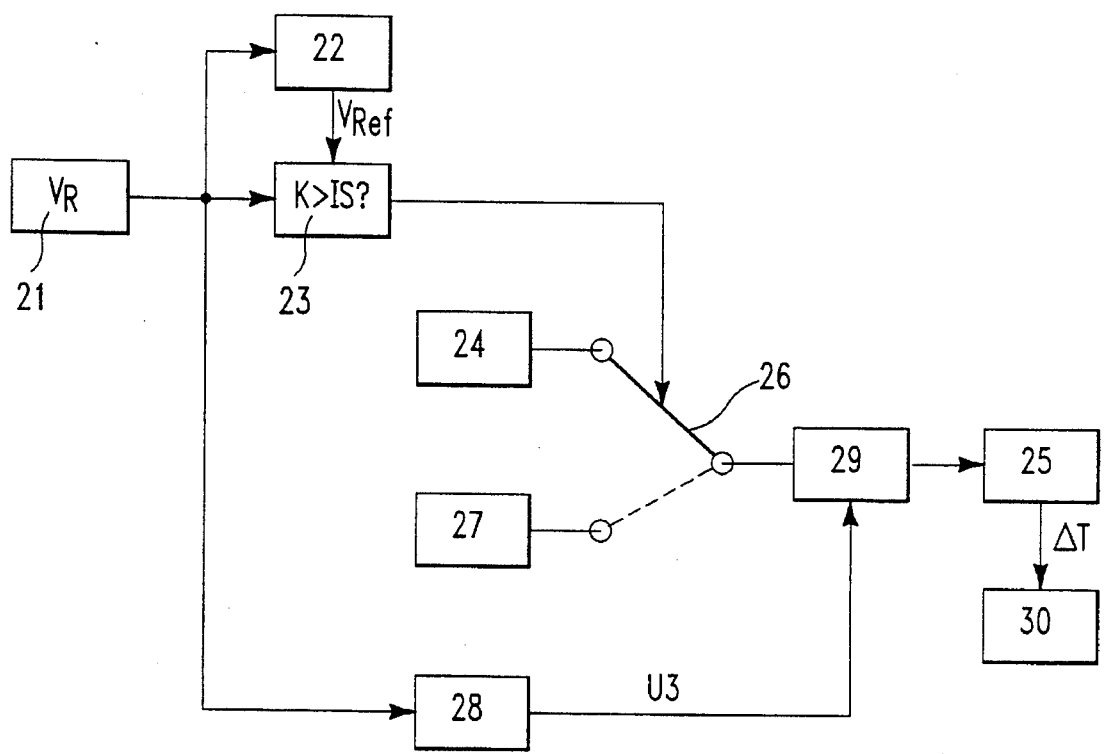
FIG. 2 shows a block diagram of an ABS of different configuration, with a vibration corrector

The exemplary embodiment of FIG. 2 shows an ABS in which the wheel speed signals from the speed sensors 21 and a reference speed formed in a block 22 are used in a block 23 to derive an instability criterion K which outputs an output signal if the stability criterion exceeds a threshold IS. The instability criterion can be formed, for example, in accordance with U.S. Pat. No. 5,249,852.

If block 23 emits a signal because there is instability, a pressure reduction signal of a block 24 will pass via a switch 26 to a block 25, in which an activation time for pressure reduction is calculated, with the result that pressure at the corresponding wheel brake is reduced (valve 30). If block 23 indicates that a threshold has not been exceeded, the (symbolic) switch 26 is moved into the position shown by a broken line and a series of pressure build-up pulses from block 27 comes into effect.

Block 28 corresponds to blocks 15 to 18 in FIG. 1 and, when a vibration signal is present, transmits a correction signal U3 to a superimposition stage 29 in which the duration of pressure reduction and pressure build-up is corrected in accordance with the change in the torsional moment.

We claim:

1. Antilock brake system for a vehicle comprising valve means for controlling brake pressure at the wheels, sensors for determining wheel speeds $V_R$, evaluation circuit means for determining activation times of said valve means based on said wheel speeds $V_R$, means for determining a differential speed signal $V_D$ from said wheel speeds $V_R$, means for determining whether said signal $V_D$ has superimposed thereon a frequency ω, means for determining when said frequency ω lies within a frequency range typical of drive train vibrations, means for producing a vibration signal from said differential speed signal $V_D$ when said frequency ω lies within said range typical of drive train vibrations, means for determining when said vibration signal exceeds a threshold, means for determining an engine speed signal $V_M$, means for determining a torsional moment M(t) based on the difference between the engine speed signal $V_M$ and the differential speed signal $V_D$, and means for modifying said activation times in dependence on said torsional moment so that said drive train vibrations decay when said vibration signal exceeds said threshold.

2. Antilock brake system as in claim 1 wherein said means for determining said engine speed signal $V_M$ comprises means for measuring the actual engine speed $N_{mot}$, means for determining the total transmission ratio I, and means for determining $V_M$ in proportion to $N_{mot}/I$.

3. Antilock brake system as in claim 1 wherein said means for determining said engine speed signal $V_M$ comprises means for filtering said differential speed signal $V_D$.

4. Antilock brake system as in claim 3 wherein said vehicle has two driven wheels and said means for determining said differential speed signal $V_D$ utilizes only the speeds $V_R$ of the two driven wheels.

* * * * *